Patented Apr. 7, 1925.

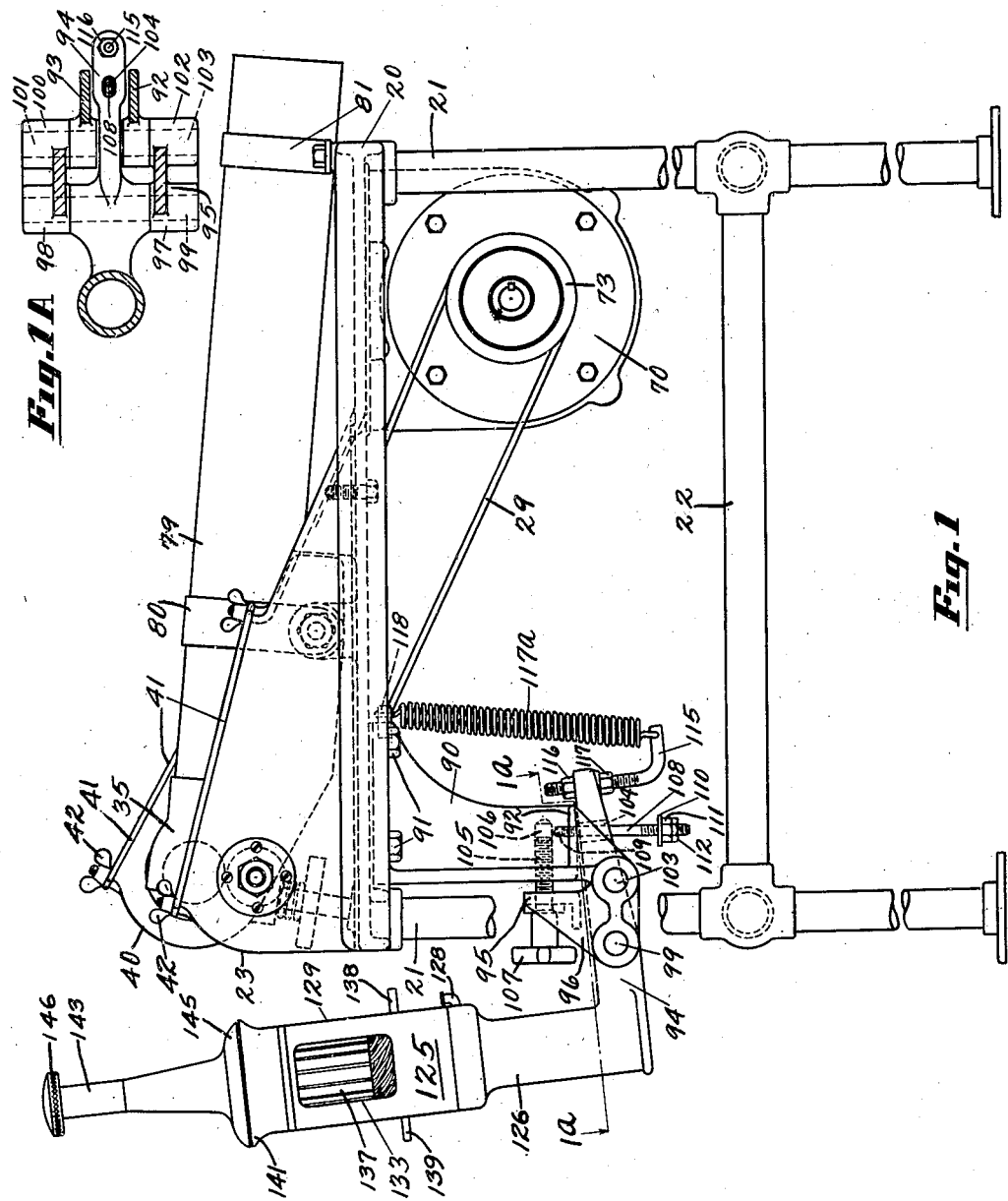

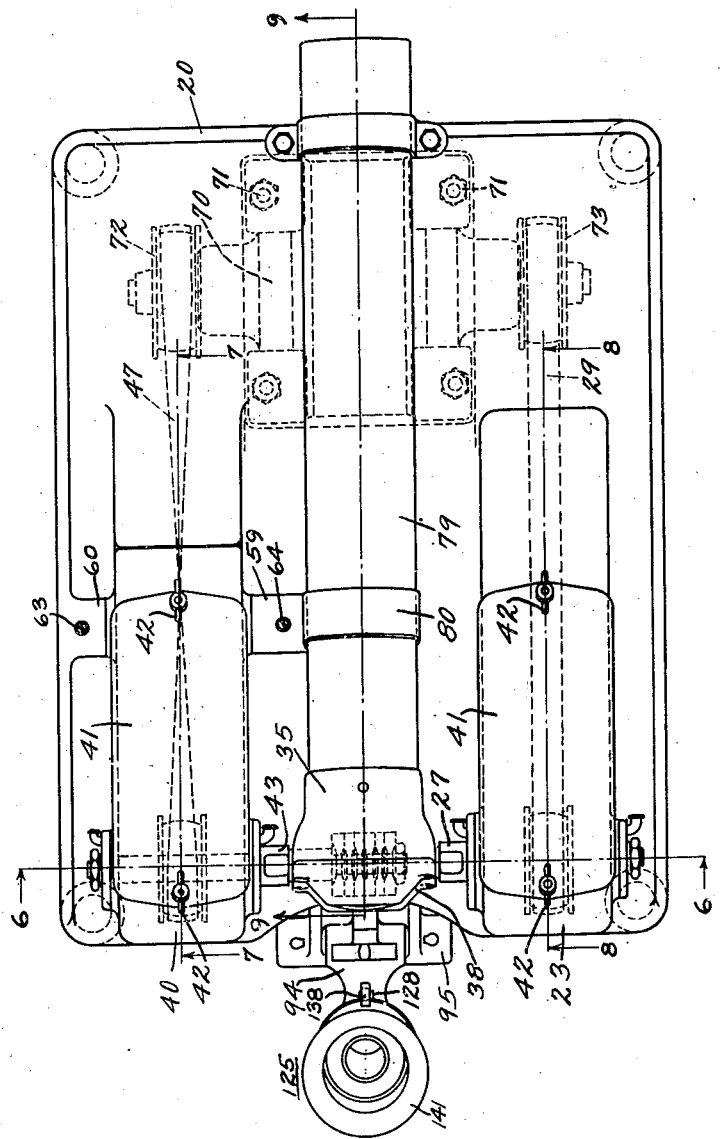

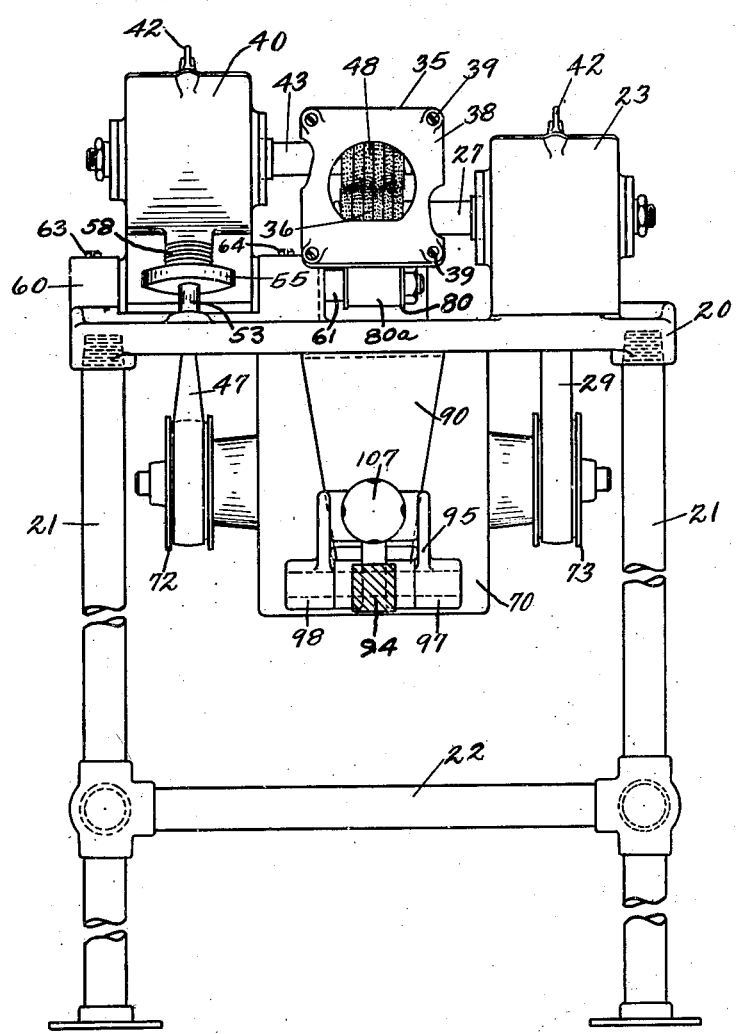

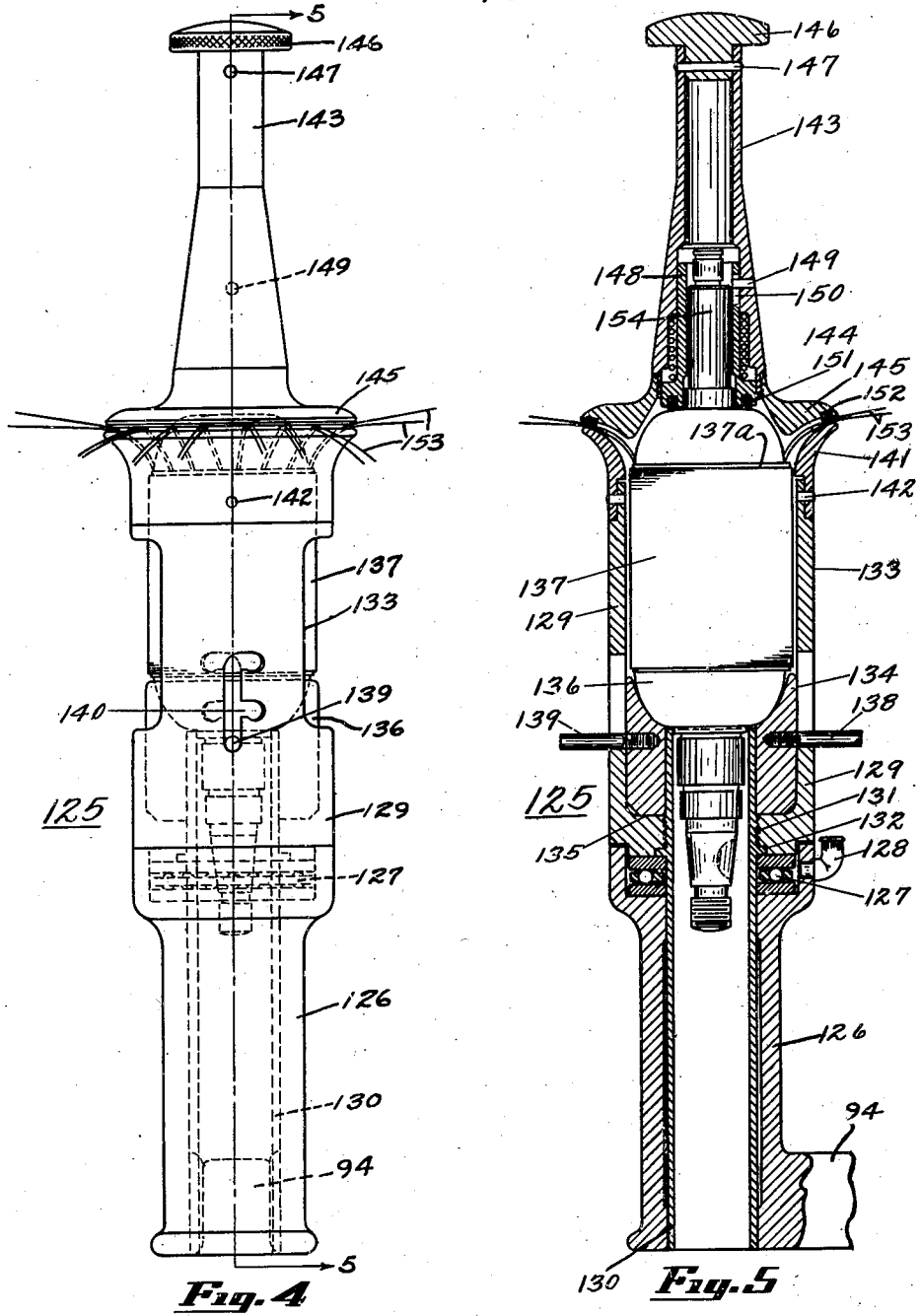

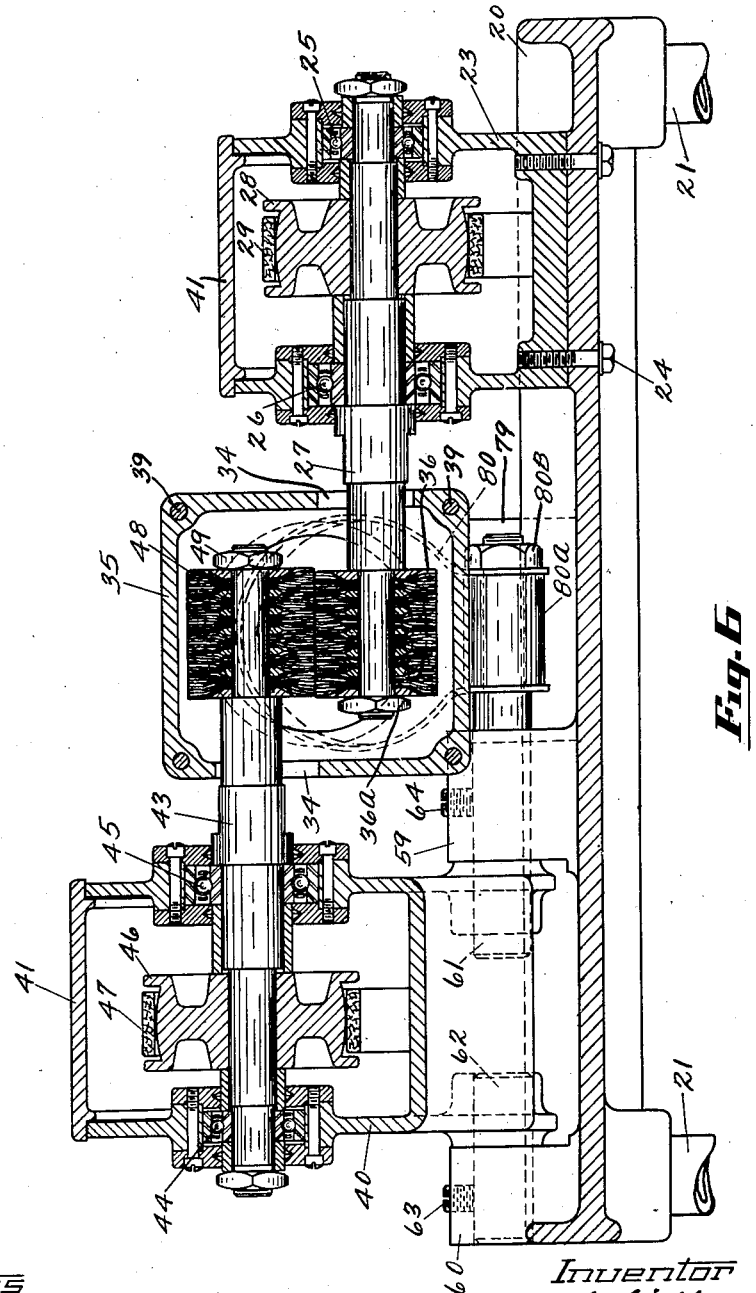

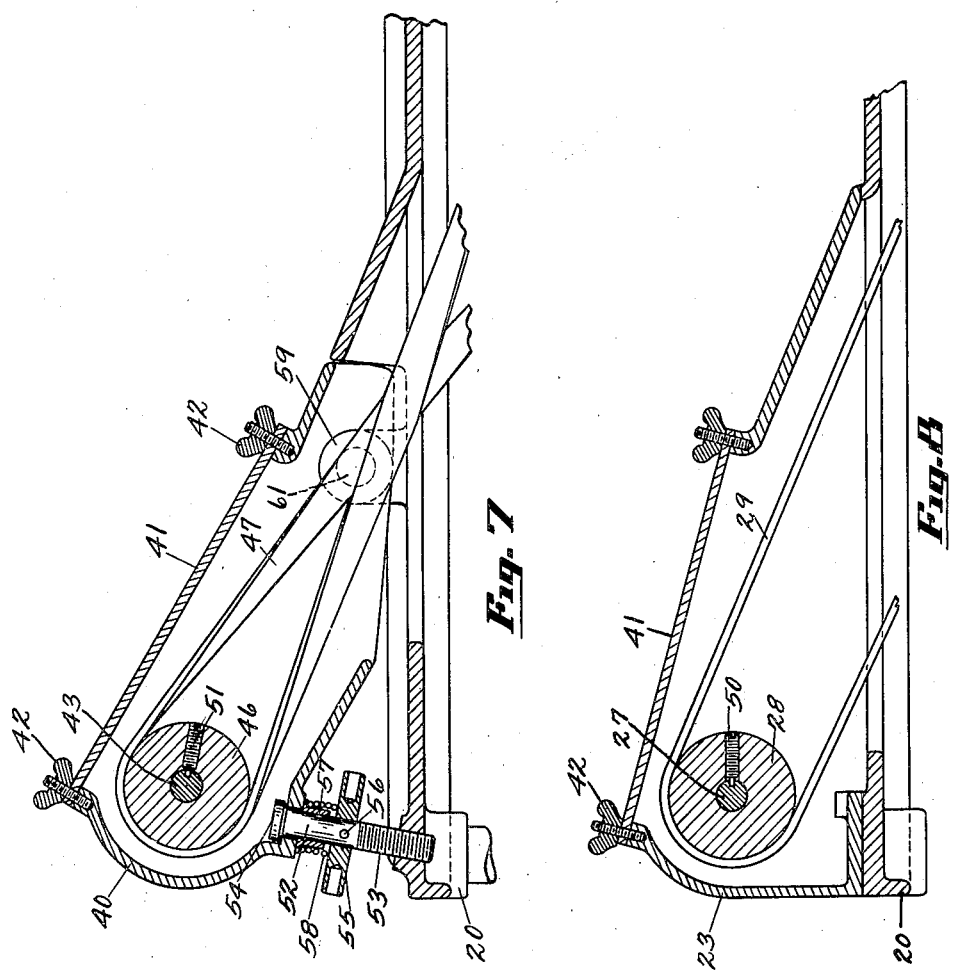

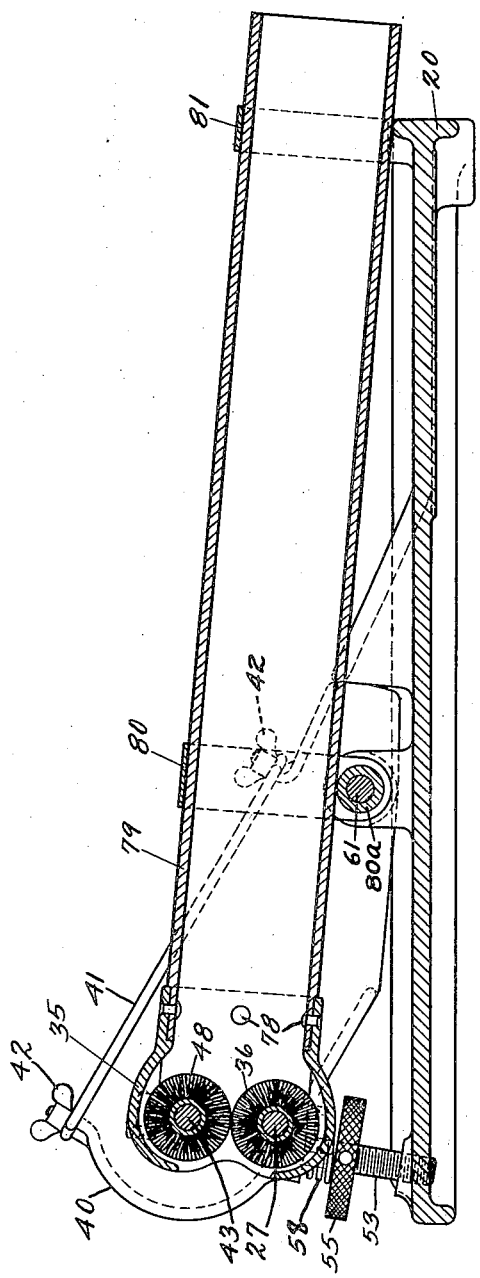

1,532,717

UNITED STATES PATENT OFFICE.

WILLIAM A. SCHILLER, OF ANDERSON, INDIANA.

INSULATION STRIPPING MACHINE.

Application filed January 20, 1923. Serial No. 614,040.

*To all whom it may concern:*

Be it known that I, WILLIAM A. SCHILLER, a citizen of the United States of America, residing at Anderson, county of Madison, State of Indiana, have invented certain new and useful Improvements in Insulation Stripping Machines, of which the following is a full, clear, and exact description.

This invention relates to an insulation stripping machine for use in connection with the manufacture of electrical apparatus and especially armatures of dynamo-electric-machines.

Among the general objects of this invention is to provide means for stripping insulation from the leads of electrical apparatus up to a predetermined distance from the apparatus.

Another object of the present invention is the provision of means for protecting from injury the other parts of electrical apparatus during the stripping operation.

Further objects and advantages of the present invention will be apparent from the following description, reference being had to the accompanying drawings, wherein a preferred embodiment of the present invention is clearly shown.

Fig. 1 is a side elevation of the stripping machine mounted on its supporting table. Some of the parts are shown in dotted lines or cut away to more clearly present the invention;

Fig. 1ª is a sectional view taken on the line 1ª—1ª of Fig. 1;

Fig. 2 is a top plan view of the machine, the cradle cover being removed;

Fig. 3 is an end elevation of the machine, showing the cradle being broken away;

Fig. 4 is a front view of the cradle;

Fig. 5 is a sectional view of the cradle, taken on the line 5—5 of Fig. 4;

Fig. 6 is a sectional view of the brush mechanism and the driving means therefor, taken on the line 6—6 of Fig. 2;

Figs. 7 and 8 are sectional views taken respectively on lines 7—7 and 8—8 of Fig. 2;

Fig. 9 is a sectional view of the brush mechanism and the draft tube construction for carrying away the waste insulation, the section being taken on line 9—9 of Fig. 2.

This invention includes generally stripping means and means for holding the work so that a predetermined portion of the leads is protected from the stripping means. The stripping means may be any device for removing insulation from a wire, such as a pair of rotating brushes having wire bristles. The work holder includes a receptacle and a cover therefor, adapted to hold the electrical apparatus with the leads protruding between the receptacle and cover so that the leads can be stripped up to any desired distance from the receptacle and therefore the apparatus.

*Stripping means.*

A mounting base 20 is supported by legs 21 to which are attached cross members 22. A casing 23 is secured to the base 20 by means of bolts 24. The casing 23 is adapted to receive bearings 25 and 26 which carry and support shaft 27 which is reduced to receive the pulley 28 driven by the belt 29. The shaft 27 extends out of the casing 23 into a housing 35 and is reduced at its extremity to receive the wire brush 36 securely mounted thereon by means of the nut 36ª engaging with the screw threaded end of the shaft 27 and adapted to rotate therewith. The housing 35 has a removable face plate 38 held in place by screws 39. This face plate 38 has a central opening as shown clearly in Fig. 3.

The construction of the casing 40 is similar to that of the casing 23 with the exception of the mounting thereof which will be described later. Both casings have removable covers 41 which are held in place by means of wing nuts 42. A shaft 43 is mounted on bearings 44 and 45 within the casing 40 and has a reduced portion to receive pulley 46 which carries belt 47. The shaft 43 extends into the housing 35 and is reduced at its extremity to receive wire brush 48, securely mounted on shaft 43 by means of nut 49 engaging with the screw threaded end of shaft 43. The pulleys 28 and 46 are locked on the shafts 27 and 43 respectively by means of set screws 50 and 51 respectively, shown in Figs. 7 and 8. The direction of rotation of the shaft 43 (and consequently the brush 48) is opposite to that of the shaft 27 (and consequently the brush 36), the same being effected by crossing of the belt 47, see Fig. 2.

The base of the casing 40 Fig. 7 is apertured to receive bolt 52, the threaded portion 53 thereof engaging with a tapped hole in the base 20. The head 54 of the bolt acts as a means for limiting the upward movement of the casing 40. The bolt 52 passes through a central opening in disc 55, which disc is held securely on the bolt 52 by means of a pin 56. Interposed between the lower face of the casing 40 and the upper face of the disc 55 is a bushing 57. This bushing 57 is reduced to receive the coil spring 58 which gives the casing 40 a slightly resilient mounting. Lugs 59 and 60 integral with the base 20 support screws 63 and 64 which lock shafts 61 and 62, respectively. The casing 40 is loosely mounted on shafts 61 and 62. Thus it will be seen that by turning the disc 55, the casing 40 may be raised or lowered in order to compensate for wear which may occur to the brushes 36 and 48. The sides of the casing 35 are provided with elongated slots 34 to allow vertical movement of the shafts 43 and 27 for the purpose of adjustment.

The electric motor 70 is hung on the base 20 by means of bolts 71, and drives at its opposite ends pulleys 72 and 73 which carry the belts 47 and 29 respectively, for driving the pulleys 46 and 28 respectively.

Suction tube 79 is held in position by means of strap 80 mounted on shaft 61 with spacing sleeve 80ª and secured by nut 80ᵇ, and also by strap 81 bolted to base 20, and has connection with an ordinary suction fan system for the purpose of carrying away the bits of insulation which are removed from the leads, or any other dirt or dust in connection with the stripping operation. The housing 35 is mounted on the suction tube 79 by means of rivets 78.

Work holder.

The bracket 90 is bolted to the base 20 by means of bolts 91 and is provided with flanges 92 and 93 adjacent the lower extremity thereof. The work holder or cradle 125, to be described more in detail later on, includes an arm 94. A yoke member 95 is provided with triangular shaped branches such as 96. The triangular shaped branches are provided with bosses 97 and 98 which carry a rod 99. The arm 94 is pivotally mounted on the rod 99 between the branches of the yoke member 95. The rods 101 and 103 are mounted in bosses formed on the flange portions 93 and 92 and provide pivotal mountings for the triangular shaped branches of the yoke member 95.

A bolt 105 passes through a hole in the yoke member 95 and engages with a tapped hole 106 in the bracket 90. The opposite end of bolt 105 is provided with a handle 107. The purpose of this adjustment just described is to raise or lower the cradle 125 by changing the axial center of the shaft 99 for a purpose to be described. The arm 94 is provided with an elongated slot 104 passing therethrough and adapted to receive stud 108 which engages with a tapped hole 109 in the bracket 90. At its lower threaded end, the stud 108 receives washer 110 and nut 111 locked in position by lock nut 112. The washer 110 acts as a stop member for limiting the downward movement of the arm 94, which may be varied by movement of the nut 111 in accordance with any desired adjustment. It will be seen that the limiting of the downward movement of the arm 94 will consequently limit the movement of the cradle 125 toward the brush mechanism.

The end of the arm 94 is apertured to receive the bolt 115, which is securely held thereto by means of the nuts 116 and 117. The bolt 115 is curved and pierced at the end thereof to receive one end of the coil spring 117ª, the other end of the spring being attached to the pin 118 which is press fitted into a bore in the bracket 90. Thus it will be seen that the spring 117ª acts to return the arm 94 to normal position. The tension of this spring may be lessened or increased by adjustment of the nuts 116 and 117 on the bolt 115.

A tubular base 126, which is integral with arm 94, is provided with an annular recess which forms a seat for bearing 127 which is lubricated from oiler 128. Mounted on the bearing 127 is a supporting casing 129 capable of rotation. A sleeve 130 passes through the tubular base 126 and has screw threaded connection 131 with the supporting casing 129. The shoulder 132 formed on the sleeve 130 tends to support the sleeve on the bearing 127. The casing 129 is cut away as at 133 (Fig. 4) in order to effect a saving of metal and also to decrease the weight thereof. The cup shaped seat 134 fits within the casing 129, slipping down over the sleeve 130 and resting on bottom wall 135 of casing 129. The seat 134 is adapted to support the overlapping windings 136 of the armature 137 during the stripping operation.

To make it possible to operate upon armatures of various lengths in this cradle 125, the seat 134 is capable of adjustment through means of the pins 138 and 139, which are screwed into the seat 134, and the bayonet slots 140 shown in Fig. 4. The operator to effect this adjustment merely has to grasp the pins 138 and 139 and raise or lower the same, as the case may be, until the pins are in alignment with the desired side slot in the bayonet slots 140, and then rotate the seat 134 and drop the pins into the slots.

A lip 141 is attached to the upper extremity of the casing 129 by means of pins or screws 142, so that it may be easily replaced in case of breakage or wear. An operating handle 143 is of tubular construction and is externally threaded at 144 to receive an internally threaded lip shaped cover 145. A cap 146 is secured to handle 143 by means of pin 147. A spring pressed sleeve 148 is adapted to fit within the handle 143 and is held therein by means of pin 149 operating in slot 150. At the lower extremity of the sleeve 148, a circular rubber washer 151 is located and is adapted to press on the upper end of the windings of armature 137 to prevent slipping of the armature. The lower face of the lip shaped cover 145 is provided with a circular washer 152 for the purpose of gripping the leads 153 from the armature windings during the stripping operation. From Fig. 5 it will be seen that the upper end of the armature shaft 154 fits within the sleeve 148 while the lower end of this shaft fits inside the sleeve 130.

When the armature 137 is placed in position in the cradle 125, and the cover 145 applied thereto, it will be seen that the portions of the leads 153 which are protected during the stripping operation will be determined by the distance from the core 137$^a$ of the armature 137 to the point where the lip 141 contacts with the cover 145. Therefore all the protected portions will be of equal length.

Operation of machine.

An armature having been completed up to the point where it is necessary to strip the leads prior to the attachment of the commutator, the cover 145 having first been removed from the cradle 125, the operator will first determine whether the adjustment of the seat 134 within the cradle 125 is proper to receive the armature to be operated upon. That is, if the armature is shorter in length than the maximum sized armature which the cradle is adapted to receive, it will be necessary for the operator to grasp the pins 138 and 139, lift up on the same, and upon reaching the proper side slot in the bayonet slots 140, effect a slight rotary motion and drop the pins in the slot. Then the operator inserts armature 137 into the cradle so that the lower end 136 thereof rests against seat 134 and the lower end of the armature shaft 154 extends down into sleeve 130. The leads 153 are then spread out and laid on lip member 141. The cover 145 is then placed in position on the cradle, the upper end of armature shaft 154 extending up into the spring pressed sleeve 148. The cover 145 remains in position through the force of gravity and the rubber washers 152 will assist in gripping the leads tightly.

The electric motor 70 having been started to operate and brushes 36 and 48 now rotating through connections heretofore described, the operator will gather together several of the loose ends of the leads 153 which are sticking out between lip 141 and cover 152 and point them in the direction of the opening in the face plate 38 of the housing 35 (Fig. 3). Then grasping the cap 146 of the operating handle 143, the operator will push the same toward the housing 35, thus moving the cradle 125 and consequently the leads 153 toward the brushes 36 and 48. This movement of the operating handle will be continued until stopped by the washer 110 contacting with the lower edge of the arm 94. This stopping point has been so predetermined that the lip 141 and the cover plate 145 will come into close proximity with the brushes 36 and 48, thus allowing the leads 153 to enter between the brushes and have the insulation torn therefrom by means of the stiff wire bristles.

The operator will then release pressure against the operating handle 143 and cradle 125 will be returned to normal position by means of spring 117 through its connection with arm 94.

The machine is now ready for another operation, whence the operator will rotate the handle 143 which in turn rotates casing 129 on bearing 127, and will gather a few more of the leads together and point them toward the stripping brushes, as above described and repeat the same operation until all of the leads have been stripped of insulation. The loose ends of leads 153, which now have had the insulation removed, will be of varying lengths and these may be easily clipped to any desired length.

The armature 137 is then removed from the cradle after the cover has been removed, and is ready for the attachment of the commutator to the armature shaft and the securing of the leads to the commutator segments in the well known manner.

From the above description, it will be apparent that the application of this invention to the manufacture of armatures for dynamo-electric-machines will effect a great saving in labor, as well as serving as a protection to the other parts of the armature during the period that the insulation is being stripped from the commutator leads.

As the brushes wear down through use, it is necessary to adjust the same to compensate for that wear, so that the brushes will contact with each other. At the same time, it is necessary to adjust the work holder so that the lips will align with the tangent point of the brushes. This adjustment of the work holder is provided for through means of the bolt 105 and stud 108, described heretofore.

While the form of mechanism herein shown and described constitutes a preferred form of embodiment of the invention, it is to be understood that other forms might be adopted, all coming within the scope of the claims which follow.

What I claim is as follows:

1. A machine for stripping insulation from the leads of armature coils comprising, in combination, an insulation stripping device, a device for holding the armature with a portion of each coil lead enclosed, and means for moving one device relative to the other.

2. A machine for stripping insulation from the leads of armature coils comprising, in combination, an insulation stripping device, a device for housing the armature and a portion of each coil lead and provided with an orifice through which the leads project to be exposed to the action of the stripping device, and means for moving one device relative to the other.

3. In a machine for stripping the insulation from commutator leads of a dynamo armature, the combination with stripping brushes, of a cradle for supporting the armature and movable with respect to the stripping brushes, and a cover for said cradle adapted to hold the commutator leads so that a predetermined portion thereof will remain intact.

4. In a machine for stripping insulation from commutator leads of a dynamo armature, the combination with a set of stripping brushes, one of said brushes having an adjustable mounting and the other a stationary mounting, of a cradle for supporting the armature and movable into close proximity with the stripping brushes, and a cover for said cradle adapted to hold the commutator leads so that a predetermined amount of insulation on the leads may be protected during the stripping operation.

5. In an insulation stripping machine, the combination with a pair of rotating brushes mounted on parallel shafts, means for adjusting one of the shafts laterally with respect to the other; a work holder provided with lips; and means for adjusting the work holder so that the lips will be in alignment with the tangent point of the brushes.

6. In an insulation stripping machine, the combination with stripping means, a work holder provided with lips; a seat within said work holder; and means for adjusting the seat with respect to the lips.

7. In an insulation stripping machine, the combination with stripping means, a work holder provided with lips, said work holder being rotatable with respect to the stripping means and bodily movable there-toward; a seat within said work holder; and means for adjusting the seat with respect to the lips.

8. In an insulation stripping machine, the combination with a pair of rotating brushes, of a housing for said brushes; a shaft independent of the housing and carrying one of said brushes; and means for supporting the shaft and adjustable with respect to the brush housing.

9. In an insulation stripping machine, the combination with a pair of rotating brushes, of a housing for said brushes; a shaft independent of the housing and carrying a driving pulley and one of said brushes; and a casing supporting the shaft and enclosing the pulley and adjustable with respect to the brush housing.

10. In an insulation stripping machine, the combination with a pair of rotating brushes, of a housing for said brushes; a supporting base; a motor located on the lower side of said base; a casing located on the upper side of said base and adjustable with respect to the base and said brush housing.

In testimony whereof I hereto affix my signature.

WILLIAM A. SCHILLER.

Witness:
PAUL L. SCHNEIDER.